Jan. 5, 1943.  E. G. BRIDGES  2,307,565
GLASSWARE BLOWING MECHANISM
Filed Aug. 1, 1940  2 Sheets-Sheet 1

Inventor
Edward G. Bridges,
By
Attorneys

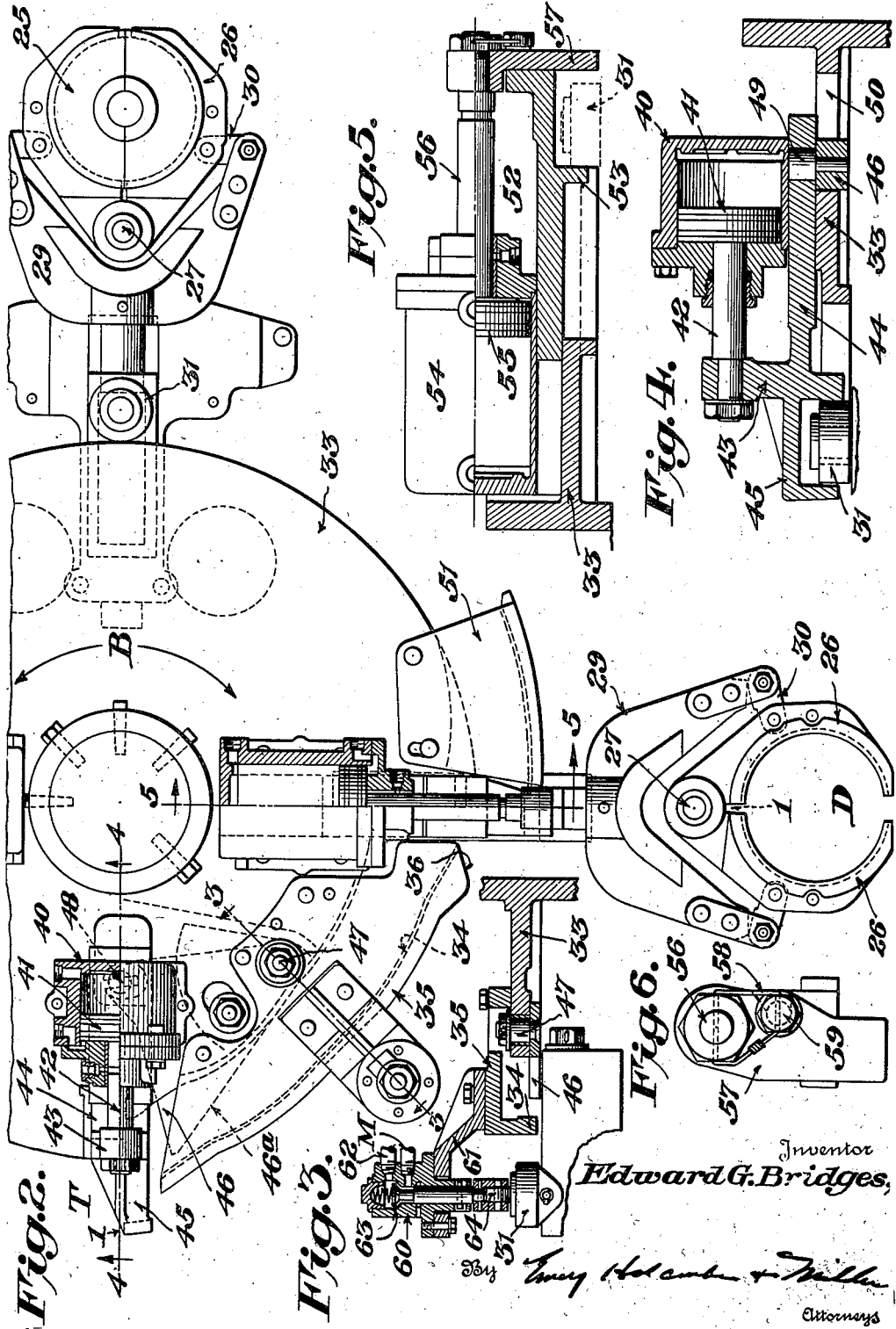

Patented Jan. 5, 1943

2,307,565

UNITED STATES PATENT OFFICE 2,307,565

GLASSWARE BLOWING MECHANISM

Edward G. Bridges, Anderson, Ind., assignor to Lynch Corporation, Anderson, Ind., a corporation of Indiana Application August 1, 1940, Serial No. 349,109

11 Claims. (Cl. 49—9)

The present invention relates to glassware blowing mechanism for forming hollow glass articles, such as containers and the like, and aims to improve mechanism of the type shown in my prior Patent No. 2,049,422, granted August 4, 1936.

One of the objects of the present invention is to improve the construction and arrangement of the finishing mold opening and closing mechanisms.

A further object of the invention is the provision of safety mechanism for stopping the machine or preventing indexing thereof upon the failure of a mold to complete its operative movement, as for example, upon failure of a mold to open, so as to avoid damage to the machine.

Other objects and advantages of the invention will be apparent to those skilled in the art in view of the following more detailed description of a preferred embodiment of the invention, such as that illustrated in the drawings.

In the drawings—

Fig. 2 is a plan view of the mold carrier and its associated mechanism;

Fig. 3 is a sectional view taken on the line 3—3 of Fig. 2;

Fig. 4 is a sectional view taken on the line 4—4 of Fig. 2;

Fig. 5 is a sectional view taken on the line 5—5 of Fig. 2;

Fig. 6 is a detail end view of the pivoted end of the finishing mold opening yoke.

Figure 1:
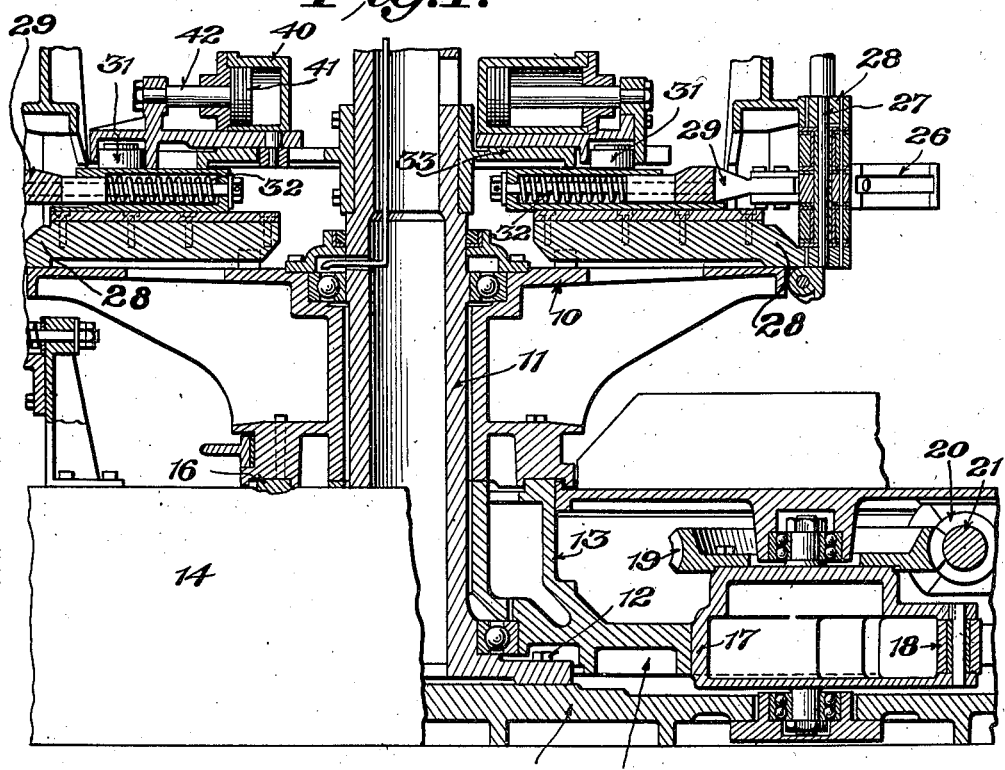
Fig. 1 is a vertical sectional view of the mechanism taken substantially on the line 1—1 of Fig. 2.
Figure 7:
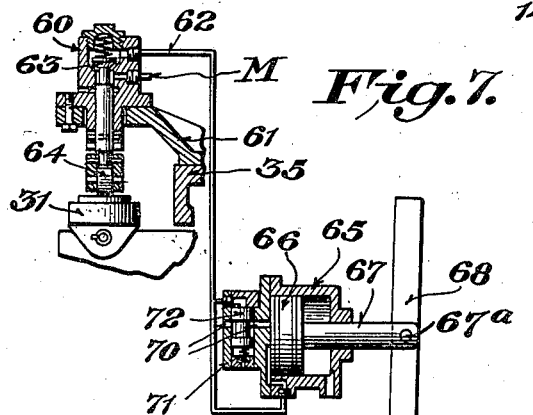
Fig. 7 is a diagrammatic view illustrating the air line connections for operating the mold opening and closing mechanism of the machine.

The embodiment of my invention selected for illustration herein relates to the final blowing mechanism for machines of the type shown in my prior Patent No. 2,049,422 adapted for blowing parisons preliminarily formed in parison forming mechanism mounted on a laterally spaced carrier, although the features of the present invention are not necessarily limited to such type of machine.

Advantageously a mold carrier 10 is rotatably mounted upon a central column 11 fastened at its lower end, as at 12, in a deep well 13 of a suitable base 14. The mold carrier is suitably rotated by means of a driven member 15 secured to the carrier as at 16, which driven member is engaged by a driving member 17. The rotation of the mold carrier may be continuous or intermittent as desired, the latter being selected for illustrative purposes, and the driven member 15 is advantageously of the Geneva wheel type while the driving member 17 is of the Geneva rotator type carrying a block 18.

If continuous rotation is desired, the members 15 and 17 may be of any approved construction, as for example of the spur gear type.

The driving member 17 has secured thereto a worm wheel 19 adapted to mesh with a worm 20 in a horizontal shaft 21 clutched as at 22 to a suitable continuously rotating motor driven shaft 23. However, the present invention is not concerned with the particular type of carrier rotating means, and other suitable drives may be used.

A plurality of sectional molds 25 are mounted upon the carrier 10 and are adapted to be moved thereby to present them successively to a transfer position T then through a blowing region B to a discharge position D, as in the case of my prior patent above referred to. Preferably as the molds move from position D to T, they are progressively closed around a moving parison so as to effect partial transfer upon arriving at position T, as will be understood.

The finishing molds 25 are preferably of the sectional type, being carried in sectional mold holders 26 suitably mounted upon hinge pins 27 in brackets 28 fastened to the mold carrier 10. Each mold mechanism includes yokes 29 slidably mounted upon brackets 28 and connected at their outer ends with the mold holders by links 30. A roller 31 is resiliently connected by spring 32 to the yoke 29 and is adapted to engage a concentric face of cam 33 for holding the mold closed during travel from the transfer position T, through blowing region B to a position just short of the discharge position D, where the mold is opened to permit the removal of the ware. During travel of the mold from position D to T the roller 31 rides in a trackway 34 of a cam 35, which trackway is so shaped as to partially close the mold around a moving parison as they approach the transfer position. When the mold reaches the transfer position, the roller 31 is moved out of the trackway 34 and moves within the fork of a mold closing mechanism to complete the transfer and position the roller 31 outwardly where it will ride upon the concentric face of cam 33.

The mechanism for finally closing the mold at position T, and moving the roller 31 outwardly so as to ride upon the concentric face of cam 33, advantageously comprises an air cylinder 40 fixedly mounted upon the cam 33 and fitted with a piston 41 having a piston rod 42 connected at its outer end to an upstanding lug 43 on a slide 44 working between the cylinder 40 and the cam 33. The outer end of the slide is formed with an open sided fork 45 to receive the roller 31 (see Fig. 4). The fork 45 is adapted to be in its innermost position as the mold reaches the position T so that it will receive the roller 31 of the partially closed mold yoke. Air under pressure controlled by a suitable valve (not shown) may then be admitted to the rear end of the piston 41 to move the fork 45 and roller 31 radially outwardly to completely close the mold and position the roller 31 in line with the concentric face of the cam 33.

Preferably the positioning of the fork 45 in its inward position to receive the roller 31 upon arrival at position T is controlled by the roller itself as it travels through the eccentric cam trackway 34 of cam 35. This advantageously may be accomplished by providing a guiding or positioning member, which may be in the form of a triangularly shaped plate 46, pivoted as at 47 to the cam 33, having one inclined face 46ª lying in the cam trackway 34 and another part pivoted as at 48 to a pin 49 on the rear end of slide 44, and working in a slot 50 of cam 33. Thus, as the roller 31 moves along the curved eccentric trackway 34, it engages the inclined face 46ª of controlling plate 46 and swings it inwardly about its pivot 47, thus moving the slide 44 and fork 45 radially inwardly so that the fork will be accurately positioned to receive the roller 31. During movement of the mold from position T through region B the glass in the mold may be subjected to the final blowing operation, and as stated above, during this travel the mold is held tightly closed by reason of engagement of roller 31 with the concentric lobe portion of cam 33.

As the mold travels toward position D, the roller 31 enters cracking cam track 51 for moving the roller inwardly slightly and partially opening the mold away from the finished ware. At this position the edge face of cam 33 is relieved as shown in dotted lines Fig. 2. This cam may be adjusted to vary the extent of cracking as desired.

The mold is adapted to be opened at position D by suitable mold opening mechanism, herein illustrated as comprising a roller receiving member 52, in the form of a slide extending radially upon the upper face of cam 33 and formed with a depending finger 53. Mounted on the cam 33 and straddling the slide 52 is an air cylinder 54 having a piston 55 therein, the piston rod 56 of which carries a pivoted finger 57 at its outer end, which finger 57 overlies the end of slide 52 and forms with finger 53 an open sided roller receiving fork. The finger 57 is freely swingable upon the end of the piston rod and is provided with a notch 58 in one edge, receiving a pin 59 on the slide, so that the finger is displaceable or swingable in one direction only. Air under pressure may be supplied to the cylinder 54 to operate the piston therein by suitable valve means (not shown).

As the mold 25 and roller 31 are moved into position D, the roller receiving fork formed by fingers 53—57 should be in its outer or extended position so as to receive roller 31. After the roller has been positioned within the fork, air may be admitted to the outer end of the cylinder 54 to retract the piston 55 therein and fully open the mold ready for the takeout.

The mold leaves position D in a fully opened condition and is moved toward the ware-receiving position T. As the mold leaves position D, its roller 31 enters cam track 34 extending to just short of the transfer position T and designed to progressively close the finishing mold sections around the moving parison.

In the event that the piston 55 sticks in its cylinder 54 or the fork formed by fingers 53—57 otherwise fail to be positioned in the outward position, to receive roller 31, the roller will strike the pivoted finger 57 and ride past the discharge position D with the mold in the partially closed or cracked condition. As the unopened mold leaves position D, its roller 31 rides on the outer face 36 of cam 35. This keeps the mold closed and the roller 31 out of the path of cam trackway 34.

When the above described operation takes place, means are provided for stopping the machine by rendering the carrier rotating means inoperative. Located beyond the discharge position D, at a convenient position between D and T, is a valve casing 60 mounted on a bracket 61 carried by a suitable fixed part of the machine, as for example the cam 35. The casing is provided with a constant air inlet port M and an outlet port 62 between which is a valve seat adapted to be closed by a poppet valve 63, the stem of which carries a roller 64 adapted to be engaged and raised by the roller 31. Lifting the poppet valve admits air under pressure from line M to line 62 leading to a clutch throw-out cylinder 65 for disengaging a clutch in the main driving shaft 23 of the machine.

The clutch disengaging mechanism advantageously may comprise an air cylinder 65 having a piston 66 thereon, the rod 67 of which is pivotally connected as at 67ª to one end of a lever 68, pivotally connected as at 68ª to a suitable part of the machine frame, the opposite end of the lever 68 being pivotally connected as at 68ᵇ to the clutch part 22 for adjusting the clutch 22 on shaft 23. Air line 62 from said valve 60 leads to the rear end of said cylinder 65 for actuating the piston to disengage the clutch. The clutch may be reset by hand so that pneumatic operation in one direction only is required, and may be maintained in operative position by a suitable spring.

In manually resetting the clutch, air in the rear of cylinder 65 should be freely exhausted, which is permitted by communicating exhaust ports 70 with cylinder 65 and valve casing 71. When, however, the piston 66 is to be actuated, these exhaust ports should be closed which may be accomplished by a pneumatically operated valve 72 connected to air line 62.

My invention provides new and improved mechanism for glassware forming machines to accurately control the positioning of movable parts relative to station parts, insuring proper operation of the machine and reducing damage due to jamming of such mechanism. Furthermore, as described, means are provided for stopping the machine in certain cases, where continued movement would result in serious damage and breakage.

My invention is not to be restricted to the details shown and described but instead contemplates other constructions fully within the scope of the appended claims.

I claim:

1. In a glassware forming machine, a rotary mold carrier, a plurality of finishing molds thereon, each comprising a pair of sections, a linkage connected to each pair of sections for opening and closing them, means for operating said linkage for opening said mold at a ware-discharging position, means for moving a part of said linkage in a controlled non-circular path with the mold sections in opened condition from said discharging position, and for progressively closing said sectional molds as they approach a subsequent ware-receiving position, means for guiding said linkage part outside of said controlled path in the event said mold fails to move open at said discharging station, and means controlled by the movement of the guided part for stopping the machine.

2. In a glassware forming machine a rotary mold carrier, a hinge pin secured to the carrier, a pair of mold sections hingedly mounted on the hinge pin, means for rotating said carrier, a reciprocable member for moving said sections about their hinge pin, a roller carried thereby, cam means for actuating said roller normally maintaining said mold sections in closed position during a region of mold travel, a cam trackway for reciprocating said roller and controlling the movement of said mold sections during another region of mold travel, a mold operating mechanism at a fixed position relative to mold travel and including a member adapted to receive said roller, and means controlled by the movement of said roller for moving said roller-receiving member to proper position to receive said roller as it leaves said trackway.

3. In a glassware forming machine, a rotary mold carrier, a hinge pin secured to the carrier, a pair of mold sections hingedly mounted on the hinge pin, means for rotating said carrier, a reciprocable member for moving said sections about their hinge pin, a roller carried thereby, cam means for actuating said roller normally maintaining said mold sections in closed position during a region of mold travel, a cam trackway for reciprocating said roller and controlling the movement of said mold sections during another region of mold travel, a mold operating mechanism at a fixed position relative to mold travel and including a member adapted to receive said roller, and means positioned in said trackway and controlled by the movement of said roller for moving said roller-receiving member to proper position to receive said roller as it leaves said trackway.

4. In a glassware forming machine, a rotary mold carrier, a hinge pin secured to the carrier, a pair of mold sections hingedly mounted on the hinge pin, means for rotating said carrier, a reciprocable member for moving said sections about their hinge pin, a roller carried thereby, cam means for actuating said roller normally maintaining said mold sections in closed position during a region of mold travel, a cam trackway for reciprocating said roller and controlling the movement of said mold sections during another region of mold travel, a mold operating mechanism at a fixed position relative to mold travel and including a member adapted to receive said roller, and a pivotally mounted guiding and positioning member having a portion lying in said cam trackway for engagement by said roller for moving said roller-receiving member in one direction.

5. In a glassware forming machine, a rotary mold carrier, a hinge pin secured to the carrier, a pair of mold sections hingedly mounted on the hinge pin, means for rotating said carrier, a reciprocable member for moving said sections about their hinge pin, a roller carried thereby, cam means for actuating said roller normally maintaining said mold sections in closed position during a region of mold travel, a cam trackway for reciprocating said roller and controlling movement of said mold sections during another region of mold travel, a mold operating mechanism at a fixed position relative to mold travel and including a member adapted to receive said roller, a pivotally mounted guiding and positioning member having a portion lying in said cam trackway for engagement by said roller for moving said roller-receiving member in one direction, and fluid pressure operated means for moving said roller-receiving member in an opposite direction.

6. In a glassware forming machine a rotary mold carrier, a hinge pin secured to the carrier, a pair of mold sections hingedly mounted on the hinge pin, means for rotating said carrier, a reciprocable member for moving said sections about their hinge pin, a roller carried thereby, cam means for actuating said roller normally maintaining said mold sections in closed position during a region of mold travel, a cam trackway for reciprocating said roller and controlling movement of said mold sections during another region of mold travel, a mold operating mechanism at a fixed position relative to mold travel and including a member adapted to receive said roller, a guide member pivotally connected to a fixed part of the machine and to said roller-receiving member and having a portion lying in the said cam trackway for engagement by said roller for accurately positioning said receiving member to receive said roller as it leaves said trackway.

7. In a glassware forming machine, a rotary mold carrier, a hinge pin secured to the carrier, a pair of mold sections hingedly mounted on the hinge pin, means for rotating said carrier, a reciprocable member for moving said sections about their hinge pin, a roller carried thereby, cam means for actuating said roller normally maintaining said mold sections in closed position during a region of mold travel, a cam trackway for reciprocating said roller and controlling movement of said mold sections during another region of mold travel, a mold operating mechanism at a fixed position relative to mold travel and including a member adapted to receive said roller, a guide member pivotally connected to a fixed part of the machine and to said roller-receiving member and having a portion lying in the said cam trackway for engagement by said roller for accurately positioning said receiving member to receive said roller as it leaves said cam trackway, and additional means for moving said receiving member and roller radially beyond said cam trackway.

8. In a glassware forming machine, a rotary mold carrier, a hinge pin secured to the carrier, a pair of mold sections hingedly mounted on the hinge pin, means for rotating said carrier, a reciprocable member for moving said sections about their hinge pin, a roller carried thereby, cam means for actuating said roller normally maintaining said mold sections in closed position during a region of mold travel, a cam trackway for reciprocating said roller and controlling movement of said mold sections during another region of mold travel, a mold operating mechanism at a fixed position relative to mold travel and including a member adapted to receive said roller, a guide member pivotally connected to a fixed part of the machine and to said roller-receiving member and having a portion lying in the said cam trackway for engagement by said roller for accurately positioning said receiving member to receive said roller as it leaves said cam trackway, and additional means for moving said receiving member and roller radially beyond said cam trackway, said last named means being fluid pressure operated.

9. In a glassware forming machine a rotary mold carrier, a hinge pin secured to the carrier, a pair of mold sections hingedly mounted on the hinge pin, means for rotating said carrier, a reciprocable member for moving said sections about their hinge pin, a roller carried thereby, cam means for actuating said roller normally maintaining said mold sections in closed position during a region of mold travel, a cam trackway for reciprocating said roller and controlling movement of said mold sections during another region of mold travel, a mold operating mechanism at a fixed position relative to mold travel and including a member adapted to receive said roller, said receiving member including a part displaceable in the direction of mold travel to permit passage of said roller therebeyond in the event that said receiving member is not accurately positioned to receive said roller.

10. In a glassware forming machine a rotary mold carrier, a hinge pin secured to the carrier, a pair of mold sections hingedly mounted on the hinge pin, means for rotating said carrier, a reciprocable member for moving said sections about their hinge pin, a roller carried thereby, cam means for actuating said roller normally maintaining said mold sections in closed position during a region of mold travel, a cam trackway for reciprocating said roller and controlling movement of said mold sections during another region of mold travel, a mold operating mechanism at a fixed position relative to mold travel and including a member adapted to receive said roller, said receiving member including a pivoted part swingable in the direction of mold travel to permit passage of said roller therebeyond in the event that said receiving member is not accurately positioned to receive said roller.

11. In a glassware forming machine a rotary mold carrier, a hinge pin secured to the carrier, a pair of mold sections hingedly mounted on the hinge pin, means for rotating said carrier, a reciprocable member for moving said sections about their hinge pin, a roller carried thereby, cam means for actuating said roller normally maintaining said mold sections in closed position during a region of mold travel, a cam trackway for reciprocating said roller and controlling movement of said mold sections during another region of mold travel, a mold operating mechanism at a fixed position relative to mold travel and including a member adapted to receive said roller, said receiving member including a pivoted part swingable in the direction of mold travel to permit passage of said roller therebeyond in the event that said receiving member is not accurately positioned to receive said roller.

EDWARD G. BRIDGES.